United States Patent
Inoue (10) Patent No.: US 9,122,482 B2
(45) Date of Patent: Sep. 1, 2015

(54) IMAGE PROCESSING APPARATUS, CONTROL METHOD THEREFOR AND STORAGE MEDIUM

(75) Inventor: Go Inoue, Fujisawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 343 days.

(21) Appl. No.: 13/698,271

(22) PCT Filed: Jun. 14, 2012

(86) PCT No.: PCT/JP2012/065794
§ 371 (c)(1),
(2), (4) Date: Nov. 15, 2012

(87) PCT Pub. No.: WO2013/002100
PCT Pub. Date: Jan. 3, 2013

(65) Prior Publication Data
US 2013/0159743 A1    Jun. 20, 2013

(30) Foreign Application Priority Data

Jun. 29, 2011    (JP) ................................. 2011-144548

(51) Int. Cl.
*G06F 1/32* (2006.01)
*H04N 1/00* (2006.01)

(52) U.S. Cl.
CPC ............ *G06F 1/3287* (2013.01); *G06F 1/3293* (2013.01); *H04N 1/00896* (2013.01); *Y02B 60/121* (2013.01); *Y02B 60/1282* (2013.01)

(58) Field of Classification Search
USPC ........................................ 713/300, 310, 320
See application file for complete search history.

(56) References Cited

U.S. PATENT DOCUMENTS

| | | | |
|---|---|---|---|
| 6,694,440 B1 * | 2/2004 | Ishibashi | 713/310 |
| 7,143,187 B1 * | 11/2006 | Takeda et al. | 709/245 |
| 7,555,662 B2 * | 6/2009 | Kidoguchi | 713/323 |
| 7,644,164 B2 | 1/2010 | Saiki et al. | |
| 8,914,654 B2 * | 12/2014 | Shizuno | 713/320 |
| 2003/0014626 A1 * | 1/2003 | Poeluev et al. | 713/153 |
| 2003/0191963 A1 * | 10/2003 | Balissat et al. | 713/201 |
| 2010/0235500 A1 | 9/2010 | Shizuno | |
| 2011/0194133 A1 * | 8/2011 | Fujisawa | 358/1.13 |

FOREIGN PATENT DOCUMENTS

| | | |
|---|---|---|
| JP | 2001-125850 A | 5/2001 |
| JP | 2006-259906 A | 9/2006 |
| JP | 2010-219605 A | 9/2010 |
| WO | 2006/067831 A1 | 6/2006 |

* cited by examiner

*Primary Examiner* — Zahid Choudhury
(74) *Attorney, Agent, or Firm* — Fitzpatrick, Cella, Harper & Scinto (57) ABSTRACT

A second control unit in an image processing apparatus receives a packet transmitted from an external apparatus, copies and stores the received packet, analyzes the header of the received packet, deletes the analyzed header, and, when transitioning the image processing apparatus from a second power mode to a first power mode based on the result of analysis in the case where the image processing apparatus is in the second power mode, transitions the image processing apparatus from the second power mode to the first power mode, and transfers to the first control unit the received packet that was stored and does not transfer to the first control unit the received packet from which the header was deleted.

16 Claims, 11 Drawing Sheets

```
SA
  SPI : 258
  ENCRYPTION ALGORITHM : 3DES
  AUTHENTICATION ALGORITHM : SHA1
  ENCRYPTION KEY : XXXXXXX
  AUTHENTICATION KEY : YYYYYYY
  VALIDITY PERIOD :10000 sec
  ELAPSED TIME : 200 sec
  TRANSMISSION DATA VOLUME : 200KB
  SEQUENCE NUMBER : 800
  DESTINATION IP ADDRESS : 192.168.1.2
  SOURCE IP ADDRESS : 192.169.4.40
  DESTINATION PORT NUMBER : 80
  SOURCE PORT NUMBER : 31200
```

IMAGE PROCESSING APPARATUS, CONTROL METHOD THEREFOR AND STORAGE MEDIUM

TECHNICAL FIELD

The present invention relates to an image processing apparatus that executes power saving control, a control method therefor, and a storage medium.

BACKGROUND ART

There are image processing apparatuses in recent years that have a power saving function for transitioning to a "sleep state" in which the device operates at low power with power supply restricted to part of the device, in the case where the device is non-operational for longer than a fixed period. Also, with the widespread use of network technology, it is common for image processing apparatuses to periodically perform exchange of data between device and host utilizing a network. In order to process data via a network in the case where the device is in the "sleep state", the device needs to be transitioned to a "non-sleep state". Accordingly, in an environment where data is frequently exchanged over a network, the time spent in the "sleep state" will be short.

In order to resolving this, Japanese Patent Laid-Open No. 2006-259906 proposes a technique of installing a plurality of CPUs in the device, and performing processing with a main CPU when not in sleep, while performing the processing of the main CPU by proxy with a sub CPU having low power consumption when in sleep. Furthermore, a technique of installing a protocol stack in the sub CPU, in order to expand the processing that the sub CPU can perform by proxy following the increased diversity and complexity of network protocols, has also been conceived.

On the other hand, in recent years, following the widespread use of security functions for preventing eavesdropping and falsification of data flowing through a network, systems are being used that allow devices to perform complex negotiations with communication partners, and to perform encryption and decryption based on the result of the negotiations. This has lead to increasing opportunities for security communication to also be used in the exchange of network data periodically exchanged between device and host. Means has also been conceived for performing the processing of the main CPU by proxy at the time of such security communication, by installing a security function in the sub CPU, and exchanging information required for security communication with the main CPU. Following the widespread use of security technology and improvements in power saving technology described above, it is desired to perform data processing while maintaining the low power state of the device, even when exchange of data between device and host on a network is performed by security communication.

However, the following problems exist with the conventional technology. With a system in which a protocol stack is installed in a sub CPU, as in the above conventional technology, the problem arises that, in the case where the device returns from the sleep state after receiving a network packet, the main CPU is not able to process the received packet appropriately. This is mainly caused by the protocol stack of the sub CPU removing information such as the IP header and Ethernet header, and transferring only the body of the packet to the main CPU. Thus, since required header information is not attached to the received packet, the main CPU is not able to perform appropriate processing.

In addition, there is a problem when security communication is performed in that, even if the sub CPU transfers a received packet to the main CPU correctly, the packet will constitute an unauthorized sequence in subsequent security communication, preventing communication from being performed normally. This is mainly caused by the presence of information for certifying communication in security communication, and the sub CPU transferring updated information to the main CPU. Thus, in the main CPU, inconsistencies occur between the received packet and information required in security communication, preventing the subsequent communication sequence from being performed normally.

SUMMARY OF INVENTION

The present invention enables realization of an image processing apparatus that, in the case where a protocol stack is installed in a sub CPU that performs some of the functions of a main CPU by proxy in a sleep state, and it is determined, after analyzing a packet received from outside in the sleep state, to process the packet with the main CPU, transfers appropriate information to the main CPU, a control method therefor, and a storage medium.

One aspect of the present invention provides an image processing apparatus capable of operating in any of a first power mode in which power is supplied to both a first control unit and a second control unit, and a second power mode in which power is supplied to the second control unit and is not supplied to the first control unit, the second control unit comprising: receiving means for receiving a packet transmitted from an external apparatus; storage means for copying and storing the packet received by the receiving means; analysis means for analyzing a header of the packet received by the receiving means, and deleting the analyzed header; determination means for, in a case where the image processing apparatus is in the second power mode, determining whether to transition the image processing apparatus from the second power mode to the first power mode based on a result of the analysis by the analysis means; and processing means for, in a case where it is determined by the determination means to transition the image processing apparatus from the second power mode to the first power mode, transitioning the image processing apparatus from the second power mode to the first power mode, and transferring to the first control unit the received packet stored by the storage means and not transferring to the first control unit the received packet from which the header was deleted by the analysis means.

Another aspect of the present invention provides an image processing apparatus capable of operating in any of a first power mode in which power is supplied to both a first control unit and a second control unit, and a second power mode in which power is supplied to the second control unit and is not supplied to the first control unit, and capable of executing security communication with an external apparatus, the second control unit comprising: first holding means for holding security information relating to the security communication; receiving means for receiving a packet transmitted from the external apparatus; storage means for storing the security information held by the first holding means, in a case where a packet transmitted from the external apparatus is received by the receiving means; updating means for updating the security information held by the first holding means, after the security information is stored by the storage means; determination means for, in a case where the image processing apparatus is in the second power mode, determining whether to transition the image processing apparatus from the second power mode to the first power mode based on the packet received by the receiving means; and processing means for, in a case where it is determined by the determination means to transition the image processing apparatus from the second power mode to the first power mode, transitioning the image processing apparatus from the second power mode to the first power mode, and transferring to the first control unit the security information stored by the storage means and not transferring to the first control unit the security information updated by the updating means.

Still another aspect of the present invention provides a control method for an image processing apparatus capable of operating in any of a first power mode in which power is supplied to both a first control unit and a second control unit, and a second power mode in which power is supplied to the second control unit and is not supplied to the first control unit, the method comprising, with the second control unit: receiving a packet transmitted from an external apparatus; copying and storing the received packet; analyzing a header of the received packet, and delete the analyzed header; in a case where the image processing apparatus is in the second power mode, determining whether to transition the image processing apparatus from the second power mode to the first power mode based on a result of the analysis; and in a case where it is determined to transition the image processing apparatus from the second power mode to the first power mode, transitioning the image processing apparatus from the second power mode to the first power mode, and transferring to the first control unit the received packet that was stored and not transferring to the first control unit the received packet from which the header was deleted.

Yet still another aspect of the present invention provides a control method for an image processing apparatus capable of operating in any of a first power mode in which power is supplied to both a first control unit and a second control unit, and a second power mode in which power is supplied to the second control unit and is not supplied to the first control unit, and capable of executing security communication with an external apparatus, the method comprising, with the second control unit: holding security information relating to the security communication; receiving a packet transmitted from the external apparatus; storing the held security information, in a case where a packet transmitted from the external apparatus is received; updating the held security information, after the security information is stored; in a case where the image processing apparatus is in the second power mode, determining whether to transition the image processing apparatus from the second power mode to the first power mode based on the received packet; and in a case where it is determined to transition the image processing apparatus from the second power mode to the first power mode, transitioning the image processing apparatus from the second power mode to the first power mode, and transferring to the first control unit the security information that was stored and not transferring to the first control unit the security information that was updated.

Further features of the present invention will be apparent from the following description of exemplary embodiments with reference to the attached drawings.

DESCRIPTION OF EMBODIMENTS

Embodiments of the present invention will now be described in detail with reference to the drawings. It should be noted that the relative arrangement of the components, the numerical expressions and the numerical values set forth in these embodiments do not limit the scope of the present invention unless it is specifically stated otherwise.

First Embodiment

System Configuration

Hereinafter, a first embodiment will be described with reference to FIGS. 1 to 5. In the present embodiment, the case will be described where, at the time of exchanging network packets with an external apparatus, an image processing apparatus transmits/receives network packets in plain text, rather than by security communication. First, the configuration of a network system that uses an image processing apparatus according to the present embodiment will be described, with reference to FIG. 1.

Figure 1:
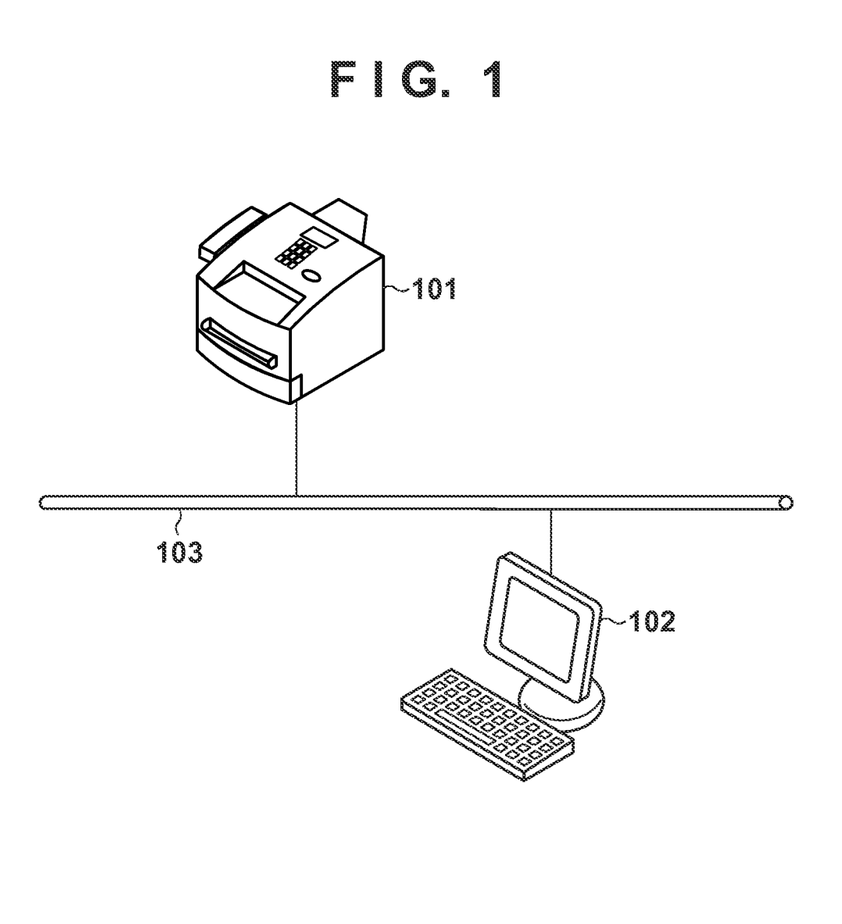
FIG. 1 is a diagram showing a network configuration according to a first embodiment.

An image processing apparatus 101 and a host computer 102 are connected through a network 103 and can communicate with each other. It is assumed that an IPSec function is active in both the image processing apparatus 101 and the host computer 102, and IPSec is applied to all communication between the image processing apparatus 101 and the host computer 102.

Hardware Configuration of Image Processing Apparatus

Figure 2:
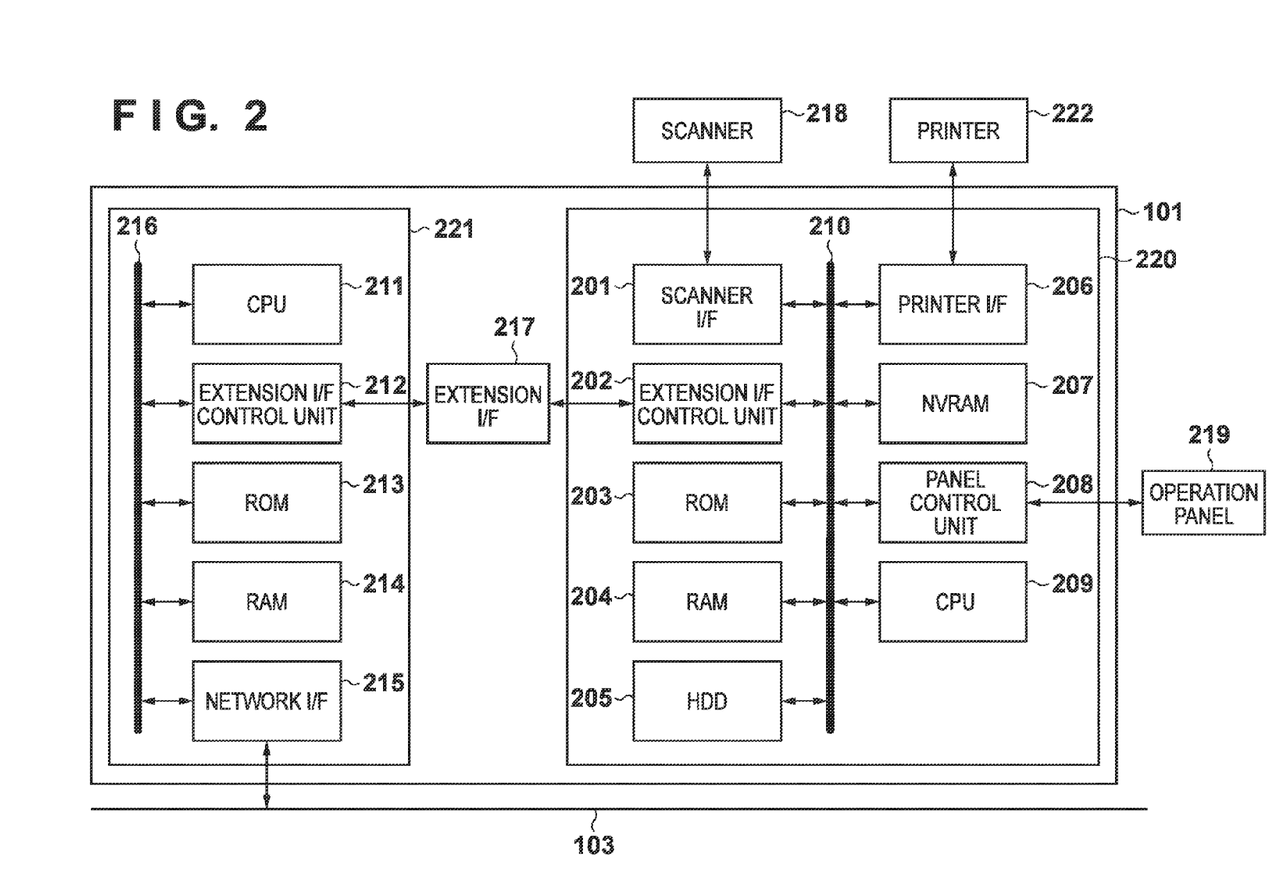
FIG. 2 is an H/W configuration diagram of an image processing apparatus according to the first embodiment.

Next, the hardware configuration of the image processing apparatus 101 will be described, with reference to FIG. 2. The image processing apparatus 101 is, as shown in FIG. 2, constituted by two control units consisting of a unit 220 (first control means) that has a CPU 209 and performs overall control of the entire apparatus, and a unit 221 (second control means) that has a CPU 211 and performs some of the processing of the unit 220 by proxy, when the unit 220 has transitioned to a sleep state due to power saving control. Note that, here, a copier will be described as an example of the image processing apparatus 101. Accordingly, the unit 220 is equivalent to a controller portion of a copier, and the unit 221 is equivalent to a network interface card (NIC) of a copier. Also, the image processing apparatus 101 has a power saving function, and when in a "sleep state" a reduction of power consumption is realized by supplying power to only the unit 221, and stopping power supply to all other components.

The unit 220 is provided with a scanner I/F 201, an extension I/F control unit 202, a ROM 203, a RAM 204, an HDD 205, a printer I/F 206, an NVRAM 207, a panel control unit 208, and the CPU 209. The components are communicably connected to each other by a system bus 210. The unit 221 is provided with the CPU 211, an extension I/F control unit 212, a ROM 213, a RAM 214, and a network I/F 215. The components are communicably connected to each other by a system bus 216.

A control program and the like executable by the CPU 209 are stored in a program ROM of the ROM 203. Information and the like used in the unit 220 are stored in a data ROM of the ROM 203. The CPU 209 performs overall control of access to the various devices connected to the system bus 210, based on the control program stored in the program ROM of the ROM 203. Also, the CPU 209 outputs image signals serving as output information to a printer 222 connected through the printer I/F 206, and controls image signals input from a scanner 218 connected through the scanner I/F 201.

The RAM 204 functions mainly as a main memory, a work area and the like of the CPU 209, and memory capacity can be extended using an option RAM connected to an extension port (not shown). The hard disk drive (HDD) 205 is used as a job storage area for storing font data, an emulation program, form data and the like, and for temporarily spooling print jobs and controlling spooled jobs from outside. Furthermore, the HDD 205 is also used as a box data storage area that holds image data read by the scanner 218 and image data of print jobs as box data, is referenced from a network, and performs printing. Reference numeral 207 denotes a nonvolatile memory (NVRAM) in which various setting information set through the operation panel 219 is stored via the panel control unit 208.

A control program and the like executable by the CPU 211 are stored in a program ROM of the ROM 213. Information and the like used in the unit 221 are stored in a data ROM of the ROM 213. The CPU 211 performs overall control of access to the various devices connected to the system bus 216, based on the control program stored in the program ROM of the ROM 213. The RAM 214 functions mainly as a main memory, a work area, and the like of the CPU 211. The CPU 211 is capable of performing communication processing with a host computer and other image processing apparatuses on a network, through the network I/F 215.

The unit 220 and the unit 221 are connected through the extension I/F control units 202 and 212 and an extension I/F 217. The CPU 209 of the unit 220 is able to perform transmission/reception of data with the unit 221, via the extension I/F control unit 202. Similarly, the CPU 211 of the unit 221 is able to perform transmission/reception of data with the unit 220, via the extension I/F control unit 212.

Figure 3:
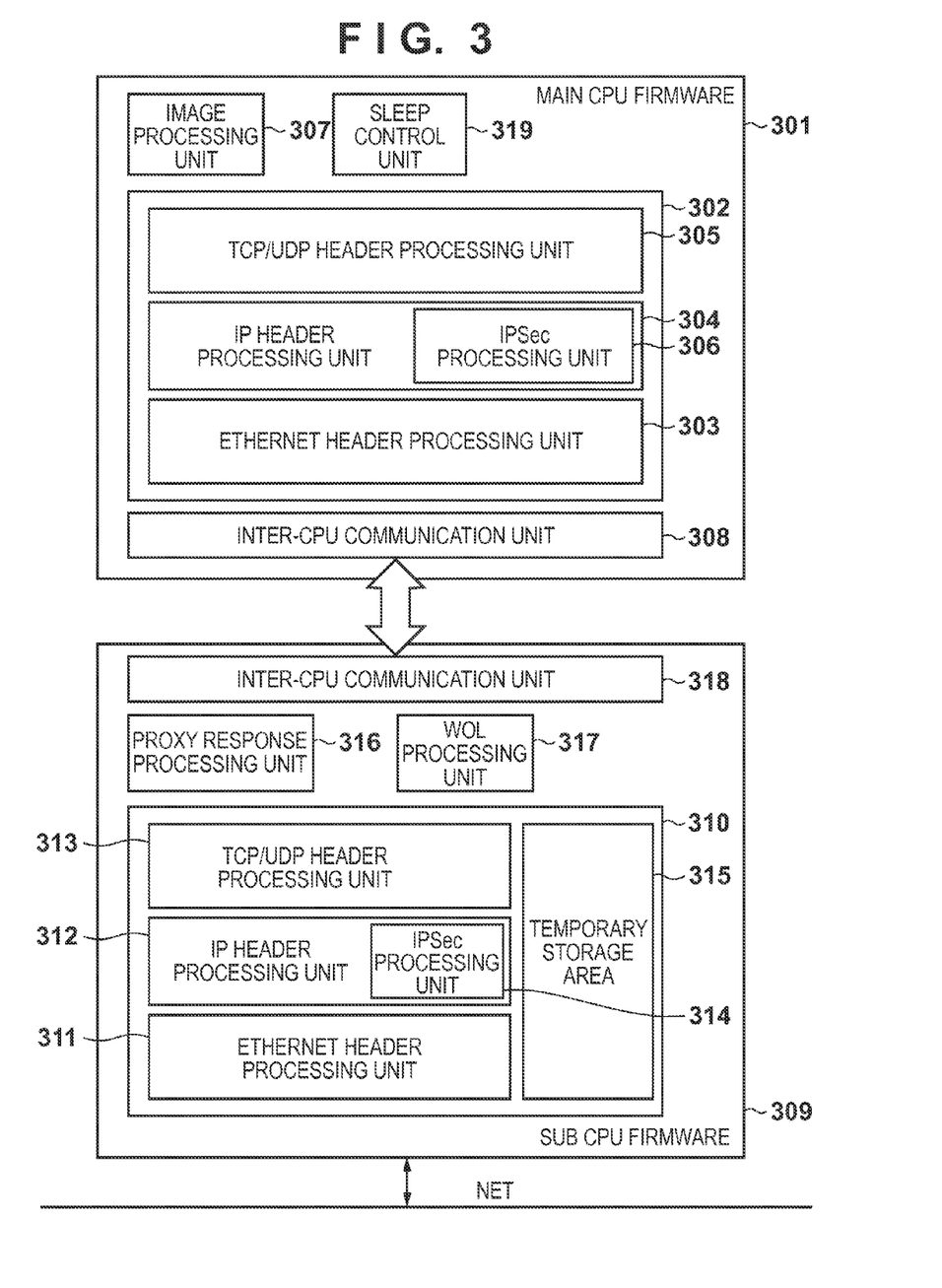
FIG. 3 is an S/W configuration diagram of the image processing apparatus according to the first embodiment.

Software Configuration of Image Processing Apparatus
Next, the software configuration of the image processing apparatus 101 will be described, with reference to FIG. 3. The software configuration of the image processing apparatus can be broadly divided into main CPU firmware 301 that operates in a non-sleep state and sub CPU firmware 309 that operates in a sleep state.

First, the main CPU firmware 301 will be described. The main CPU firmware 301 includes a protocol stack 302, an image processing unit 307, an inter-CPU communication unit 308, and a sleep control unit 319. The sleep control unit 319 operates on the CPU 209 of the unit 220, and performs control for transitioning from a "non-sleep state" (first power mode) in which power is supplied to both the unit 220 and the unit 221 to a "sleep state" (second power mode) in which power is supplied to the unit 221 but not to the unit 220.

The protocol stack 302 is constituted by an Ethernet header processing unit 303, an IP header processing unit 304 and a TCP/UDP header processing unit 305, and sequentially analyzes the header portions of a received packet using the processing units. Note that the processing units sequentially delete the analyzed header portions. An IPSec processing unit 306 operates in the layer of the IP header processing unit 304, and performs IPSec negotiation processing, IPSec processing of transmitted/received network packets, Security Association (SA) management required in IPSec processing, and the like.

The inter-CPU communication unit 308 operates on the CPU 209 of the unit 220, and performs data transmission/reception with software operating on the CPU 211 of the unit 221 using the extension I/F control unit 202, through the extension I/F 217. Also, a large number of applications such as the image processing unit 307 are installed in the main CPU firmware 301.

Next, the sub CPU firmware 309 will be described. The sub CPU firmware 309 includes a protocol stack 310, a proxy response processing unit 316, a WOL processing unit 317, and an inter-CPU communication unit 318. The inter-CPU communication unit 318 operates on the CPU 211 of the unit 221, and performs data transmission/reception with software operating on the CPU 209 of the unit 220 using the extension I/F control unit 212, through the extension I/F 217.

The protocol stack 310 is constituted by an Ethernet header processing unit 311, an IP header processing unit 312, and a TCP/UDP header processing unit 313. An IPSec processing unit 314 operates on the CPU 211 of the unit 221, and performs IPSec processing of transmitted/received network packets, and SA management. Also, the protocol stack 310 is furthermore provided with a temporary storage area 315 for temporarily storing received packets and SA information.

The proxy response processing unit 316 determines whether it is possible to respond to received packets with only the capability of the sub CPU, without restoring the main CPU, creates response packets, and performs transmission control. The WOL (Wake-on-LAN) processing unit 317 determines whether received packets conform to a pattern for restoring the main CPU, and performs restore processing in the case of restoring the main CPU. Here, WOL processing denotes processing for activating a remote apparatus through a LAN. For example, in the present embodiment, WOL processing denotes processing in which the host computer 102 activates the image processing apparatus 101 from the sleep state, through the network 103.

The sub CPU 309 is activated only in the case where the main CPU is in the sleep state. The sub CPU 309 sorts received network data into three types. Here, the three types are "discard", "transfer to main CPU", and "transmit proxy response". "Discard" indicates the case where network data that can be disregarded is received, such as in the case of a packet not being addressed to the device, and in this case the received network data is discarded without being processed. That is, "discard" does not required activation of the unit 220 (main CPU). "Transfer to main CPU" indicates the case where network data is received that requires processing of some sort on the received network data but that processing cannot be performed by only the unit 221 (sub CPU) to which power is being supplied. In this case, the sub CPU transitions the image processing apparatus 101 from the "sleep state" to the "non-sleep state", and transfers the received network packet to the main CPU (the CPU 209). "Respond by proxy" is where it is determined that activation of the unit 220 (main CPU) is unnecessary, and a response to the received network data is created and transmitted by only the unit 221. If the transmitted/received packet is an IPSec packet, transmission/reception is controlled using the IPSec processing unit 314.

Figure 4:
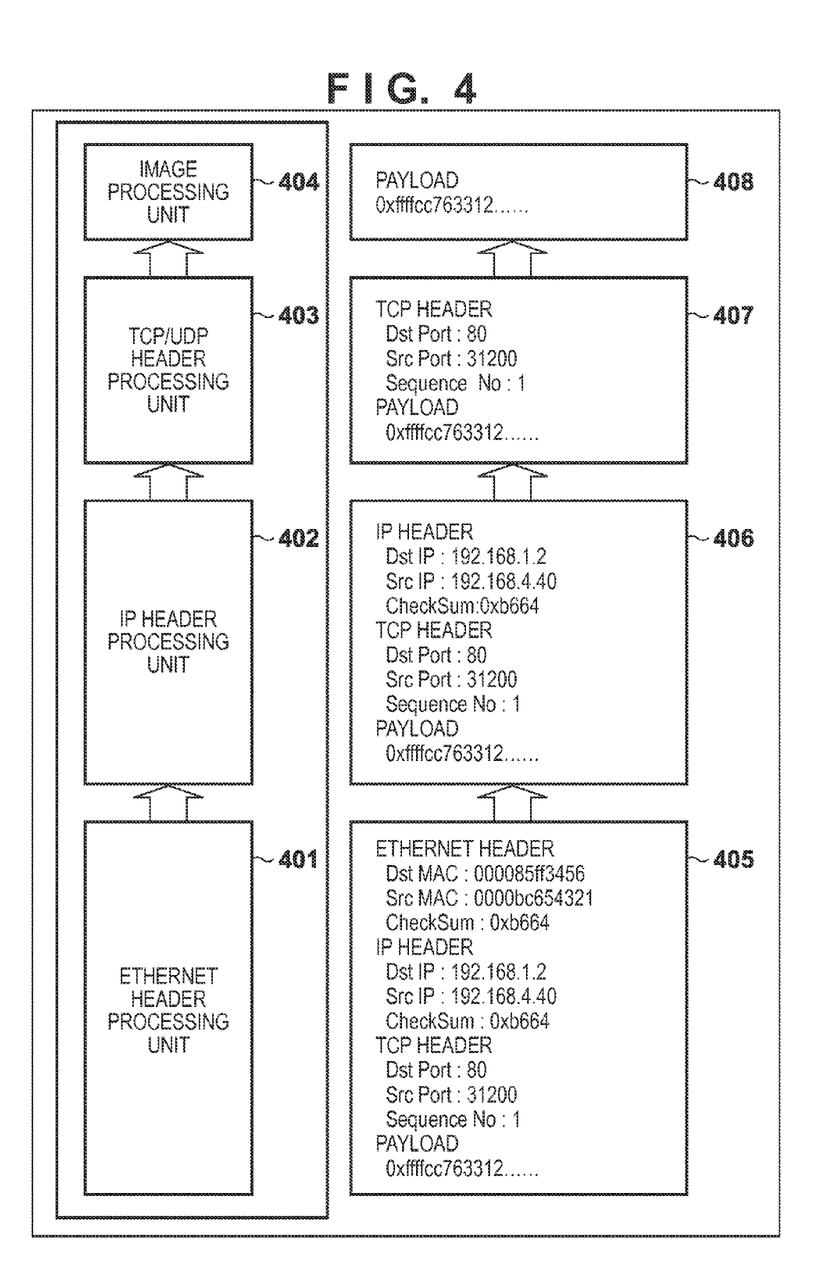
FIG. 4 is a diagram showing processing by a protocol stack according to the first embodiment.

Packet Reception Next, general packet reception behavior in the case where a protocol stack is installed will be described, with reference to FIG. 4. In the case where the image processing apparatus 101 receives packet data 405 of print data by TCP, first an Ethernet header processing unit 401 analyzes an Ethernet header. Although in reality a large number of packet parameters are defined, only parameters relevant to the present invention are described here. The Ethernet header processing unit 401 determines, with reference to the destination MAC address of the received packet, whether the destination MAC address matches the MAC address of the device, and, in the case where the destination MAC address matches, removes the Ethernet header portion and transfers the packet to an IP header processing unit 402. In the case where the destination MAC address does not match, the received packet is discarded.

Next, the IP header processing unit 402 analyzes a packet 406 from which the Ethernet header has been removed. The IP header processing unit 402 determines whether the destination IP address matches the IP address of the device, whether the checksum value is correct, and the like, and transfers the packet to a TCP/UDP header processing unit 403 if it is determined to receive the packet. If it is determined not to receive the packet, the packet is discarded or an error packet is transmitted.

Next, the TCP/UDP header processing unit 403 analyzes a packet 407 from which the IP header has been removed. The TCP/UDP header processing unit 403 mainly determines whether the destination port number matches a port number of an open port of the device, and whether the sequence number is correct. If it is determined that there is no problem, the header portion is removed and the packet is transferred to an image processing unit 404, which is an upper level application portion. If it is determined not to receive the packet, the packet is discarded or an error packet is transmitted. The image processing unit 404 analyzes a packet 408 from which the TCP header has been removed, and performs processing particular to the application.

This series of sequences is implemented by the protocol stack 310 of the sub CPU and the protocol stack 302 of the main CPU. In the case where a protocol stack is installed in the sub CPU, it is determined whether the packet is a WOL packet or a proxy response packet after the headers have been removed, as shown FIG. 4. At this time, if it is determined that the packet is a WOL packet, packet data including only the payload after the headers have been removed will be transferred to the main CPU, where the problem arises of the main CPU not being able to perform packet processing normally since there are no headers. In the present embodiment, packet reception is controlled so that such problems do not arise.

Packet Reception in Sub CPU

Figure 5:
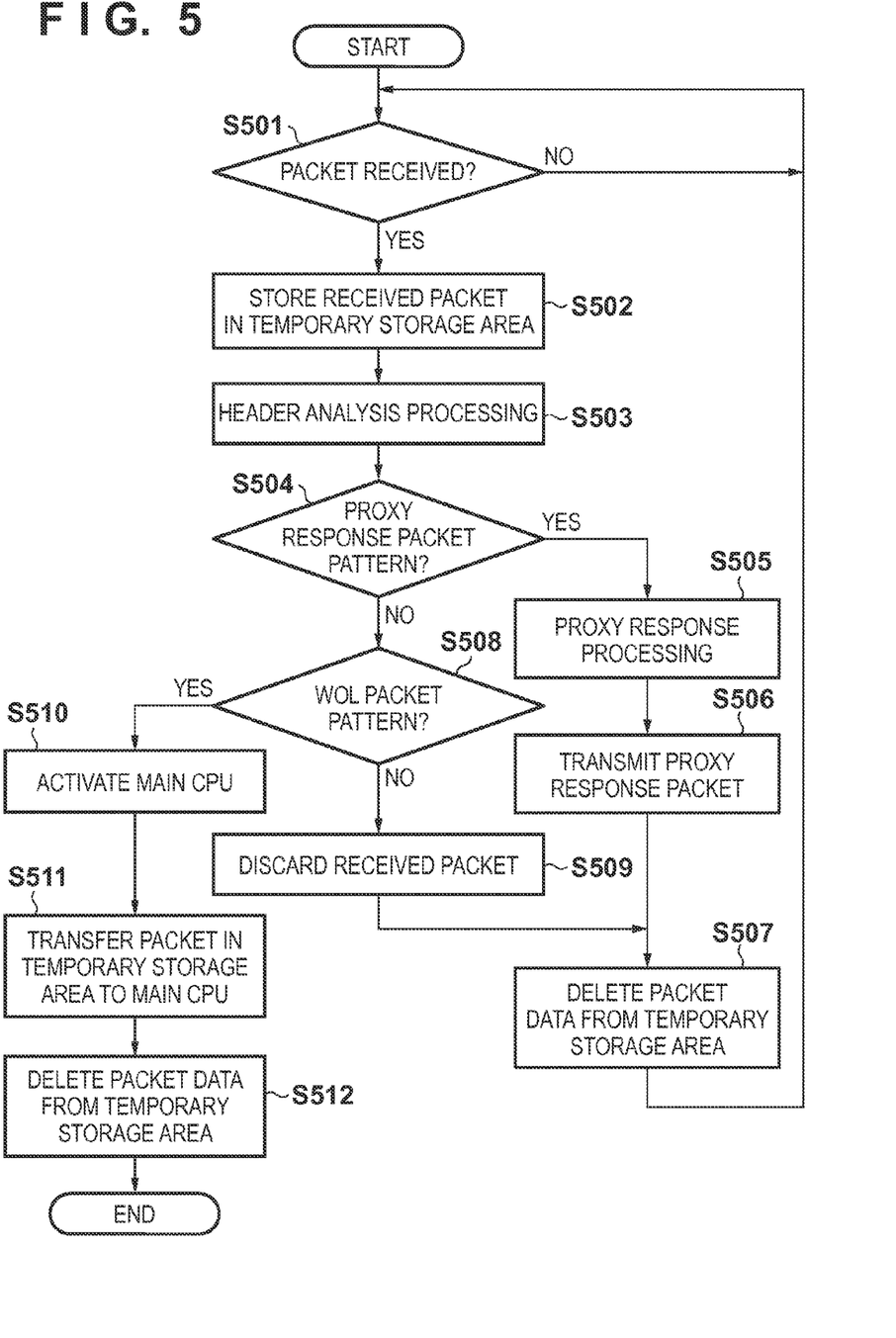
FIG. 5 is a flowchart showing processing by a sub CPU according to the first embodiment.

Next, processing procedures in the sub CPU firmware 309 when a packet is received in the sleep state according to the present embodiment will be described, with reference to FIG. 5. Note that the proxy response packet pattern and the WOL packet pattern are notified from the main CPU side to the sub CPU in advance, configured by user settings, or the like. The processing described hereinafter is realized by the CPU 211 loading the control program stored in the ROM 213 into the RAM 214 and executing the loaded program.

After the main CPU transitions to the sleep state and the sub CPU (the CPU 211) has been activated, the sub CPU waits for reception of a network packet. In S501, the CPU 211 determines whether packet data has been received. If packet data has not been received, the determination of S501 is periodically repeated. On the other hand, if packet data is received, the processing advances to S502, where the CPU 211 initially copies and stores the received packet data in the temporary storage area 315 within the sub CPU firmware.

In this way, in the present embodiment, a copy of the received packet is saved to the temporary storage area 315, separately from the received packet used in subsequent analysis processing. Even in the case where the header portions of the received packet are sequentially analyzed in a protocol stack and deleted after being analyzed, the original received packet saved to the temporary storage area 315 can thereby be transferred when the received packet needs to be transferred to the main CPU.

Next, in S503, the CPU 211 transfers the received packet to the Ethernet header processing unit 311, and then the IP header processing unit 312 and so on, performs header analysis with the analysis processing units, and removes the headers from the packet data. Subsequently, in S504, the CPU 211 determines whether the received packet is a packet pattern to which a proxy response by the sub CPU is possible, in accordance with the header analysis and payload analysis results. The processing advances to S505 if it is determined that a proxy response is possible, and advances to S508 if it is determined that a proxy response is not possible.

In S505, the proxy response processing unit 316 creates a proxy response packet. Subsequently, in S506, the proxy response processing unit 316 transmits the created proxy response packet through the inter-CPU communication unit 318. Subsequently, after the proxy response to the received packet is completed, the CPU 211, in S507, deletes the received packet stored in the temporary storage area 315, and returns to waiting for packet reception again.

On the other hand, if it is determined at S504 not to be a proxy response pattern, the WOL processing unit 317, in S508, determines whether to activate the image processing apparatus 101 by Wake-on-LAN. That is, the WOL processing unit 317 determines whether the received packet is a packet from an external apparatus instructing activation of the main CPU from the sleep state. If it is determined not to activate the image processing apparatus 101, the processing advances to S509, where the received packet is discarded, and the processing then advances to S507, where the CPU 211 also deletes the received packet stored in the temporary storage area 315, and returns to waiting for packet reception again.

On the other hand, in the case where it is determined at S508 to activate the image processing apparatus 101, that is, to activate the main CPU (the CPU 209), the processing advances to S510, where the CPU 211 activates the main CPU through the inter-CPU communication unit 318. Here, if the packet in the WOL processing unit 317 from which the headers have been removed is transferred to the main CPU side, the protocol stack of the main CPU is not able to execute processing normally. In view of this, according to the present embodiment, the CPU 211, in S511, transfers the packet data (received packet) stored in the temporary storage area 315 to the main CPU. Thereafter, in S512, the CPU 211 deletes the packet data from the temporary storage area 315 and ends the processing of the sub CPU.

As described above, the image processing apparatus according to the present embodiment is able to implement WOL processing correctly, even in the case where a protocol stack is installed in the sub CPU firmware. Specifically, with this image processing apparatus, in the case where a packet received in the sleep state needs to be processed by the main CPU, the received packet that was saved to the temporary storage area is transferred to the main CPU, rather than the data from which the header portions have been deleted after being analyzed by the protocol stack.

Second Embodiment

Next, a second embodiment will be described with reference to FIGS. 6 to 10. The present embodiment describes the case where IPSec (Internet Protocol Security) is applied as security communication performed by the image processing apparatus. IPSec is a protocol for preventing eavesdropping and falsification of data flowing through a network, using a specific authentication algorithm and encryption algorithm. IPSec is constituted by two protocols, namely, the Authentication Header (AH) protocol and the Encapsulating Security Payload (ESP) protocol, with only authentication being performed in the case of AH, while authentication and encryption are performed in the case of ESP. The decision as to which protocol to use and what type of authentication algorithm or encryption algorithm to use at that time is made during negotiations before IPSec communication. Furthermore, the method of exchanging keys used by the encryption algorithm between communication devices is also defined before IPSec communication by using Internet Key Exchange (IKE). The details of IPSec and IKE including the packet format are defined in RFCs (Request for Comments), and are thus not described in detail in the present embodiment.

Security Association

When IPSec communication is established between devices, a Security Association (SA) is generated according to that communication. Here, exemplary parameters of an SA will be described with reference to FIG. 6. While an SA is constituted by a large number of parameters, only the parameters relevant to the present embodiment are enumerated here.

Figure 6:
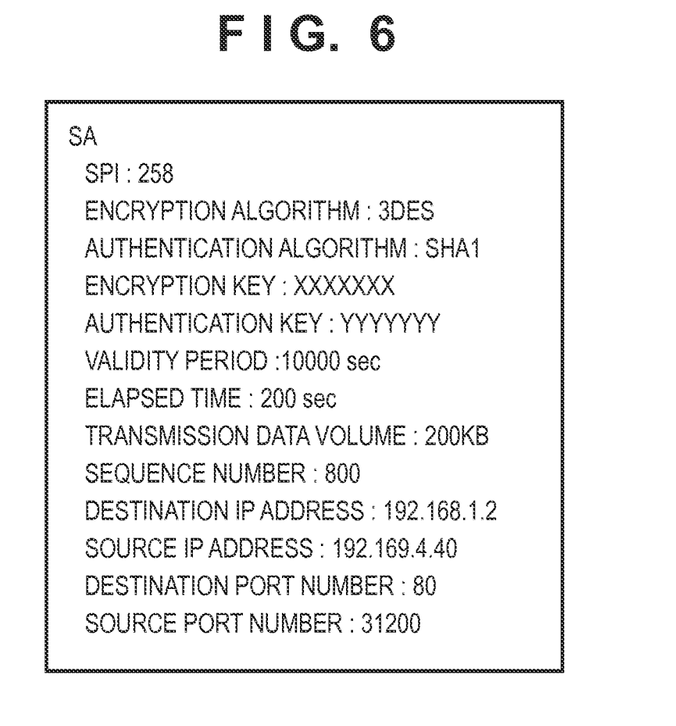
FIG. 6 is a diagram showing attributes of SA information according to a second embodiment.

SPI (Security Parameter Index) is a value for identifying the SA. Encryption Algorithm denotes the type of encryption algorithm used for this traffic. Authentication Algorithm denotes the type of authentication algorithm used for this traffic. Encryption Key denotes key information used when encrypting this traffic. Authentication Key denotes key information used when authenticating this traffic.

Validity Period is set by time (units of seconds) as the validity period of the SA. Elapsed Time denotes the elapsed time from the time that the SA was created (time that IPSec negotiation was completed), and is used in order to determine whether the validity period of the SA has been reached, that is, in order to determine whether the SA is valid. Transmission Data Volume denotes the transmitted data volume arising from SA generation. Sequence Number is a value for protecting against replay attacks, and is set in the IPSec header and incremented by 1 whenever a packet is transmitted. Destination IP Address denotes a destination IP address of IPSec traffic associated with this SA. Source IP Address denotes a source IP address of IPSec traffic associated with this SA. Destination Port Number denotes the destination port number of IPSec traffic associated with this SA. Source Port Number denotes the source port number of IPSec traffic associated with this SA.

Control by Comparative Example

Figure 7:
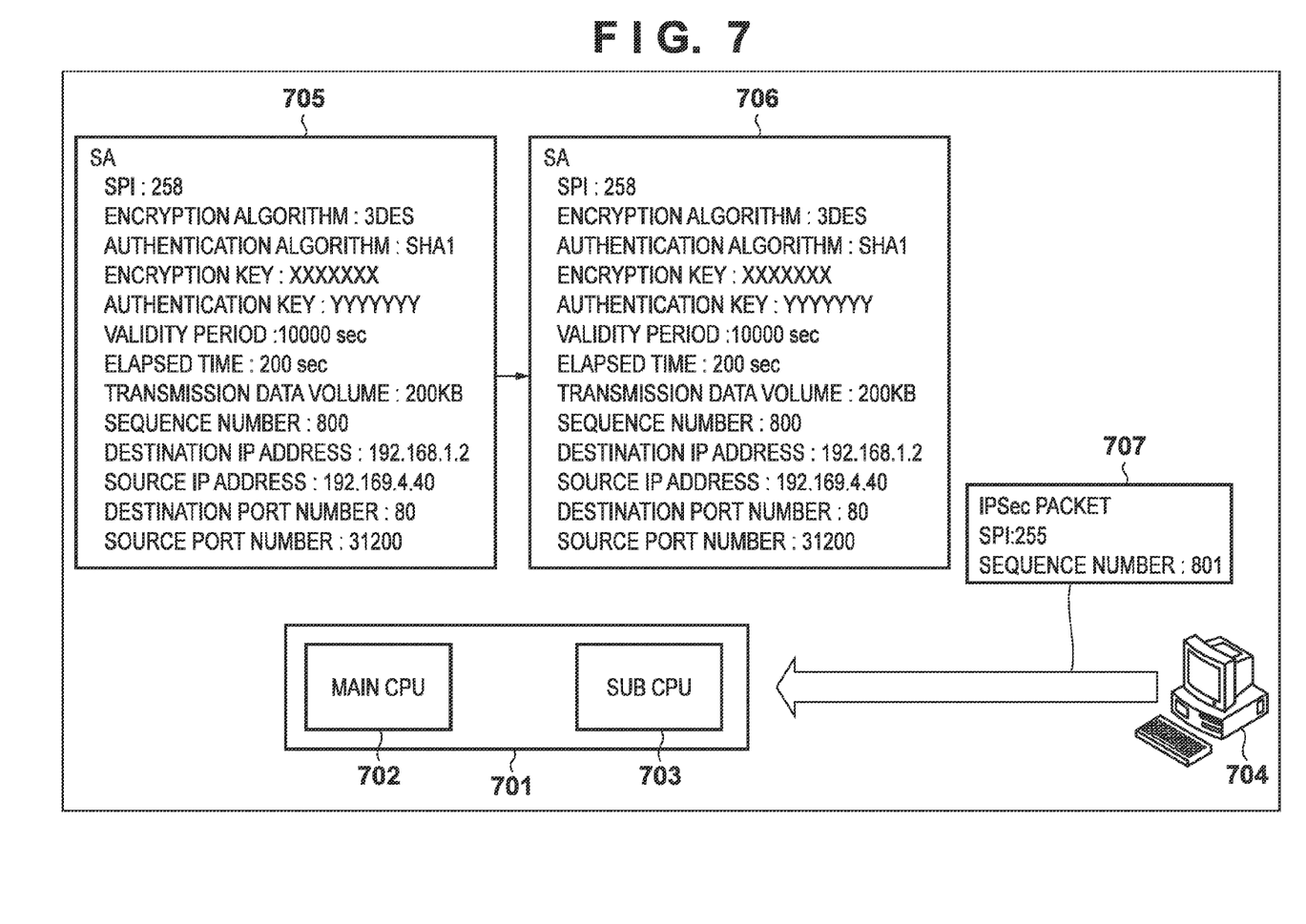
FIG. 7 is a diagram showing a problem with conventional technology for an image processing apparatus according to the second embodiment.

Next, problems with an embodiment serving as a comparative example of the case where the measures of the present embodiment are not implemented will be described, with reference to FIGS. 7 to 9. As shown in FIG. 7, IPSec communication has been established between a device 701 constituted by a main CPU 702 and a sub CPU 703 and an external host 704, and an IPSec processing unit within the main CPU has generated an SA 705. When the main CPU 702 transitions to the sleep state and the sub CPU 703 is activated, the SA is transferred from the IPSec processing unit within the main CPU 702 to the IPSec processing unit within the sub CPU 703, and an SA 706 is held within the sub CPU 703.

In the case where an IPSec packet 707 is transmitted from the external host 704 in this state, the IPSec processing unit within the sub CPU 703 analyzes the received packet. At this time it is determined, with reference to the sequence number of the packet, whether the sequence number matches an expected value. Because the sequence number of the SA 706 is 800, the expected sequence number is 801. As shown in FIG. 7, in the case where the sequence number of the received packet 707 is 801, the IPSec processing unit determined that the received packet is an authorized packet, and activates the IPSec processing.

Figure 8:
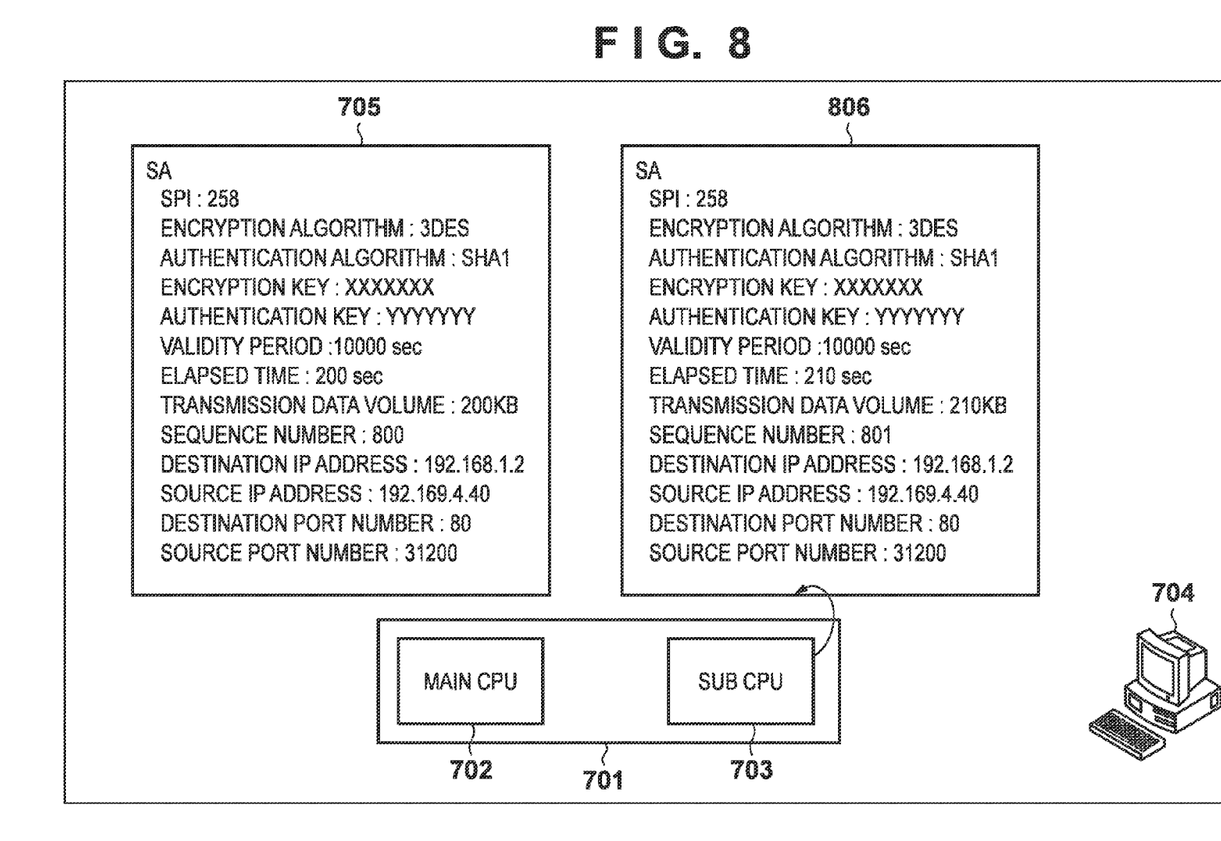
FIG. 8 is a diagram showing a problem with conventional technology for an image processing apparatus according to the second embodiment.

FIG. 8 shows the situation after the IPSec processing unit of the sub CPU 703 has executed IPSec processing. Since the IPSec processing unit of the sub CPU 703 has implemented data decryption, the sequence number of the SA being held is set to 801 and the data volume is updated by the size of the received packet, thereby obtaining an SA 806. If, as a result of determining whether to execute WOL processing on this decrypted packet with the WOL processing unit within the sub CPU 703, it is determined to execute WOL processing, the sub CPU 703 activates the main CPU 702.

Figure 9:
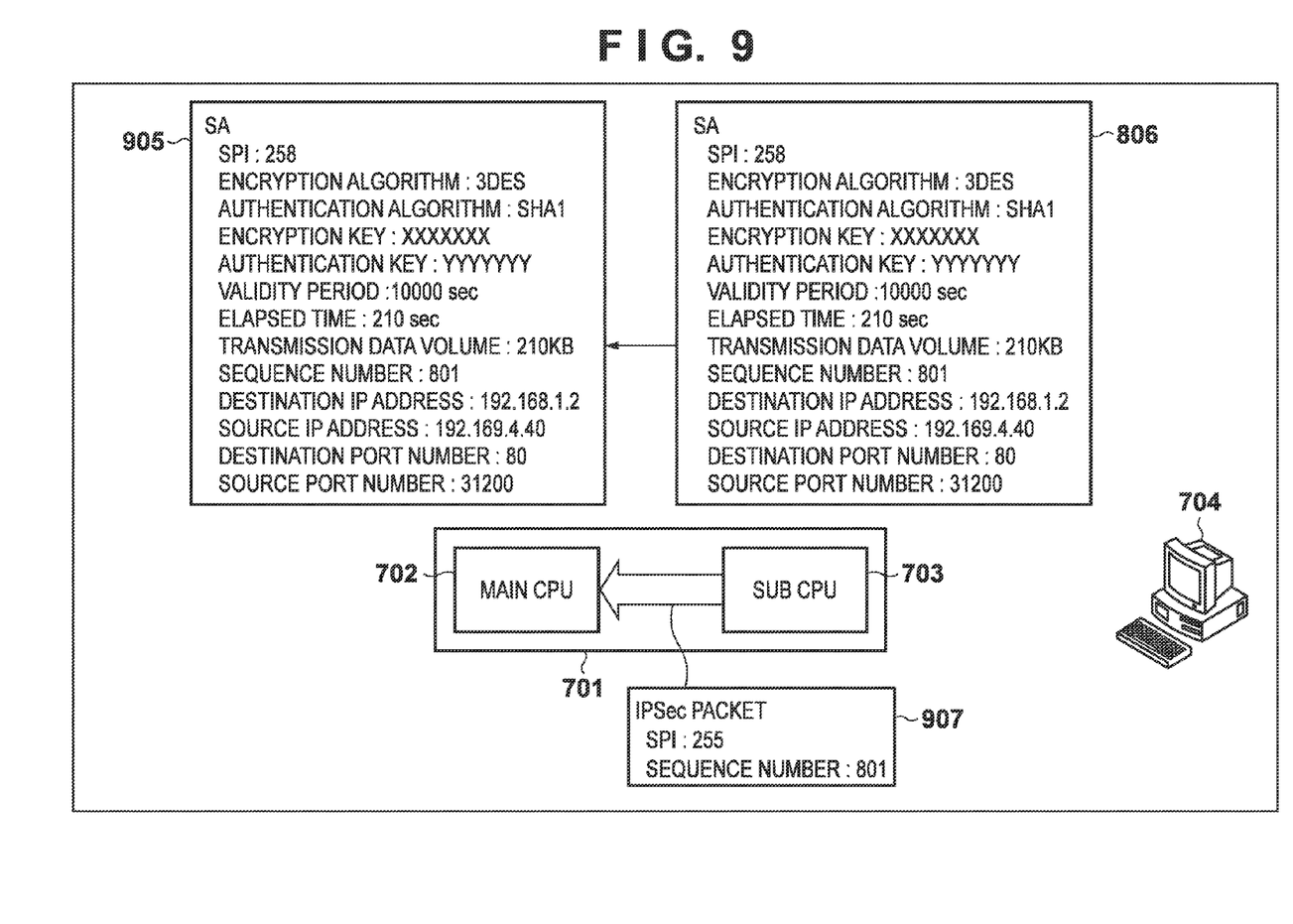
FIG. 9 is a diagram showing a problem with conventional technology for an image processing apparatus according to the second embodiment.

The situation after activation is shown in FIG. 9. At this time, the sub CPU 703 transfers a received packet 907 from the temporary storage area to the main CPU 702, and transfers the SA 806 obtained after updating the SA in FIG. 8. The main CPU 702 updates the SA information held by the IPSec processing unit of the main CPU 702 in response to the transferred SA 806, thereby obtaining an SA 905. Thereafter, the packet 907 is received and decryption processing is implemented by the IPSec processing unit of the main CPU 702. However, the sequence number of the packet 907 is 801, whereas the value expected from the sequence number 801 being held is 802. Accordingly, the IPSec processing unit does not implement IPSec processing, having regarded to the sequence number as being unauthorized. In this way, with the configuration of the comparative example, in the case where WOL processing is executed with an IPSec packet, the problem arises of not being able to process the IPSec packet correctly.

Control by Present Embodiment

Figure 10A:
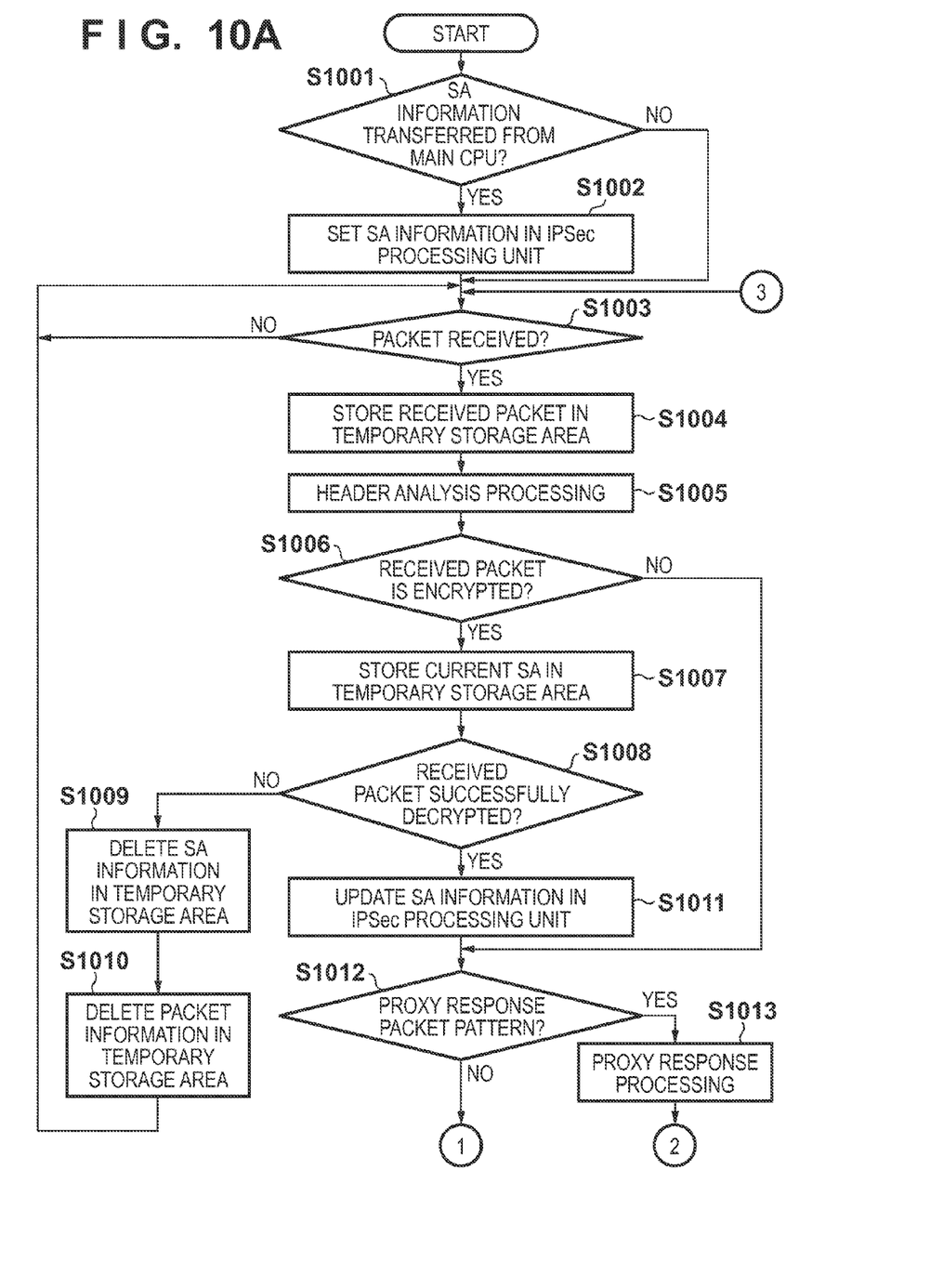
FIGS. 10A and 10B are flowcharts showing processing by a sub CPU according to the second embodiment.
Figure 10B:
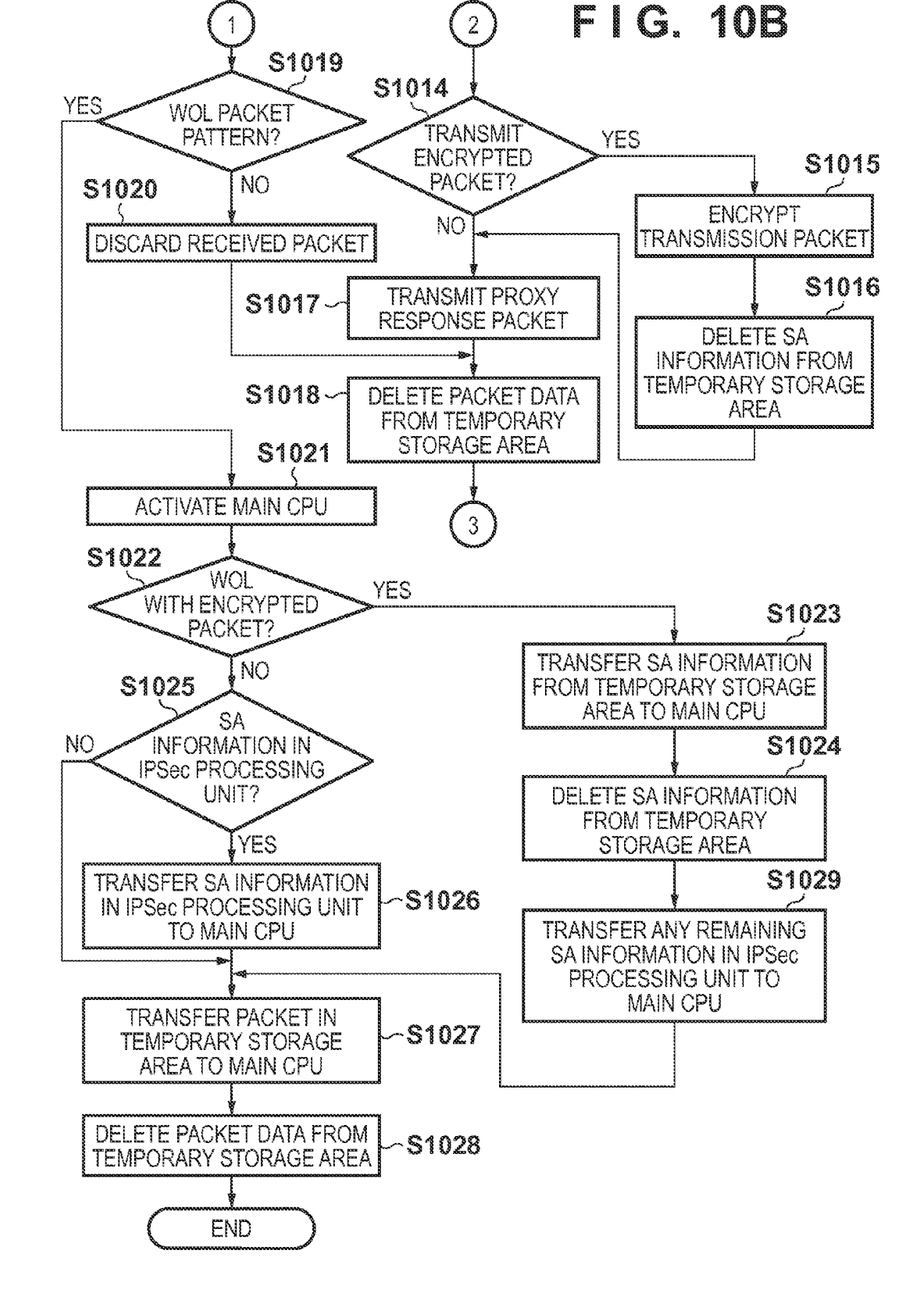

Next, the processing procedure of the sub CPU firmware in the present embodiment will be described, with reference to FIGS. 10A and 10B. The processing described hereinafter is realized by the CPU 211 loading the control program stored in the ROM 213 into the RAM 214 and executing the loaded program.

When the sub CPU firmware 309 is activated, the CPU 211, in S1001, determines whether SA information has been transferred from the main CPU firmware 301. In S1002, the CPU 211, having determined that SA information has been transferred, sets the SA information in the IPSec processing unit 314 of the sub CPU. Subsequently, in S1003, the sub CPU waits for reception of a network packet. When a network packet is received at S1003, the processing advances to S1004, where the CPU 211 copies and stores the received packet in the temporary storage area 315.

Next, in S1005, the CPU 211 performs header analysis processing on the received packet, utilizing the protocol stack 310. Furthermore, in S1006, the CPU 211 determines whether the received packet is an IPSec packet, utilizing the IPSec processing unit 314 in the IP layer. In S1007, the CPU 211, having determined that the received packet is an IPSec packet, copies and stores only the SA information relating to the received packet, which is in the IPSec processing unit 314 at this time, in the temporary storage area 315. While there is a plurality of SA information associated with a plurality of sessions in the IPSec processing unit 314, only the SA corresponding to the received packet is stored in the temporary storage area 315. In this way, in the present embodiment, corresponding SA information is saved to the temporary storage area 315, in addition to the received packet.

Next, in S1008, the CPU 211 decrypts the received packet utilizing a decryption key, and determines whether decryption was successful. If decryption of the received packet failed, the processing advances to S1009, where the CPU 211, having regarded the received packet as being either not addressed to the device or an error sequence, deletes the SA information in the temporary storage area 315 and, at S1010, deletes the packet data in the temporary storage area 315, after which the processing returns to S1003. On the other hand, if decryption is successful at S1008, the processing advances to S1011, where the CPU 211 updates the sequence number, data transmission volume and the like of the SA information in the IPSec processing unit 314, after which the processing advances to S1012. Also, in the case where a plain text packet is received in S1006, the processing advances to S1012.

In S1012, the CPU 211 determines with the proxy response processing unit 316 whether the received packet conforms to the proxy response packet pattern. If it is determined to respond by proxy, the processing advances to S1013, where the CPU 211 creates a response packet with the proxy response processing unit 316. Subsequently, in S1014, the CPU 211 determines whether the received packet is an IPSec packet. Here, in the case of an IPSec packet, the CPU 211 determines with the IPSec processing unit 314 whether to encrypt the transmission packet, since the response packet also needs to be an IPSec packet.

When it is determined to encrypt the transmission packet, the processing advances to S1015, where the CPU 211 encrypts the transmission packet with the IPSec processing unit 314, using a corresponding encryption key in accordance with the encryption method. Subsequently, in S1016, the CPU 211 deletes the SA information stored in the temporary storage area 315, after which the processing advances to S1017. In the case of this flow, the SA information stored in the temporary storage area 315 is not used. On the other hand, if it is determined in S1014 to transmit the packet in plain text, the processing advances to S1017.

In S1017, the CPU 211 transmits the response packet using the protocol stack 310. Subsequently, in S1018, the CPU 211 deletes the packet data stored in the temporary storage area 315, after which the processing returns to S1003, where the CPU 211 returns to waiting for packet data reception again. In the case of this flow, the packet data stored in the temporary storage area 315 is not used.

When it is determined at S1012 not to respond by proxy, the CPU 211, in S1019, determines with the WOL processing unit 317 whether to execute WOL processing according to the pattern of the received packet. When it is determined not to execute WOL processing, the processing advances to S1020, where the CPU 211 discards the packet because of the packet being unrelated to the device. Thereafter, the processing advances to S1018, where the CPU 211 also deletes the packet data stored in the temporary storage area 315, after which the processing returns to S1003, where the CPU 211 returns to waiting for packet data reception again.

On the other hand, when it is determined at S1019 to execute WOL processing, the CPU 211, in S1021, activates the main CPU through the inter-CPU communication unit. Subsequently, in S1022, the CPU 211 determines whether the WOL packet is an IPSec packet. When it is determined to be an IPSec packet, the processing advances to S1023, where the CPU 211 transfers WOL-related SA information copied to the temporary storage area 315, and transfers the remaining SA information stored in the IPSec processing unit to the IPSec processing unit 306 of the main CPU. After transmission, the processing advances to S1024, where the CPU 211 deletes the SA information from the temporary storage area 315. Subsequently, the processing advances to S1029, where the CPU 211, in the case of SA information remaining in the IPSec processing unit 314, transfers that information to the main CPU. Thereafter, the processing advances to S1027, where the CPU 211 transfers the received IPSec packet stored in the temporary storage area 315 to the main CPU, and, at S1028 after the end of transfer, deletes the packet data stored in the temporary storage area 315.

When it is determined at S1022 to perform WOL processing with a plain text packet, the processing advances to S1025, where the CPU 211 determines whether SA information is stored in the IPSec processing unit 314 of the sub CPU. If SA information is stored, the processing advances to S1026, where the CPU 211 transfers the SA information to the IPSec processing unit 306 of the main CPU. Thereafter, in S1027, the CPU 211 transfers the received plain text packet stored in the temporary storage area 315 to the main CPU, and, at S1028 after the end of transfer, deletes the packet data stored in the temporary storage area 315.

On the other hand, since SA information does not need to be transferred to the main CPU if there is no SA information in the IPSec processing unit 314 at S1025, the processing advances to S1027, where the CPU 211 transfers the received plain text packet stored in the temporary storage area 315 to the main CPU. After the end of transfer, the processing advances to S1028, where the CPU 211 deletes the packet data stored in the temporary storage area 315.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-144548 filed on Jun. 29, 2011, which is hereby incorporated by reference herein in its entirety.

The invention claimed is:

1. An image processing apparatus capable of operating in any of a first power mode in which power is supplied to both a first control unit and a second control unit, and a second power mode in which power is supplied to the second control unit and is not supplied to the first control unit, the second control unit comprising:

receiving means for receiving a packet transmitted from an external apparatus;

storage means for copying and storing the packet received by the receiving means;

analysis means for analyzing a header of the packet received by the receiving means, and deleting the analyzed header;

determination means for, in a case where the image processing apparatus is in the second power mode, determining whether to transition the image processing apparatus from the second power mode to the first power mode based on a result of the analysis by the analysis means; and processing means for, in a case where it is determined by the determination means to transition the image processing apparatus from the second power mode to the first power mode, transitioning the image processing apparatus from the second power mode to the first power mode, and transferring to the first control unit the received packet stored by the storage means and not transferring to the first control unit the received packet from which the header was deleted by the analysis means.

2. The image processing apparatus according to claim 1, wherein in a case where it is determined by the determination means not to transition the image processing apparatus from the second power mode to the first power mode, the processing means decides whether to respond to the received packet or discard the received packet based on the result of the analysis by the analysis means.

3. The image processing apparatus according to claim 1, wherein the processing means deletes the received packet stored by the storage means, in response to completion of processing on the received packet.

4. The image processing apparatus according to claim 1, wherein the packet received by the receiving means is an encrypted packet, and the analysis means decrypts the packet received by the receiving means.

5. The image processing apparatus according to claim 4, wherein the packet received by the receiving means is an IPSec-encrypted packet.

6. An image processing apparatus capable of operating in any of a first power mode in which power is supplied to both a first control unit and a second control unit, and a second power mode in which power is supplied to the second control unit and is not supplied to the first control unit, and capable of executing security communication with an external apparatus, the second control unit comprising:

first holding means for holding security information relating to the security communication;

receiving means for receiving a packet transmitted from the external apparatus;

storage means for storing the security information held by the first holding means, in a case where a packet transmitted from the external apparatus is received by the receiving means;

updating means for updating the security information held by the first holding means, after the security information is stored by the storage means;

determination means for, in a case where the image processing apparatus is in the second power mode, determining whether to transition the image processing apparatus from the second power mode to the first power mode based on the packet received by the receiving means; and processing means for, in a case where it is determined by the determination means to transition the image processing apparatus from the second power mode to the first power mode, transitioning the image processing apparatus from the second power mode to the first power mode, and transferring to the first control unit the security information stored by the storage means and not transferring to the first control unit the security information updated by the updating means.

7. The image processing apparatus according to claim 6, wherein the first control unit comprises second holding means for holding security information relating to the security communication; and notifying means for notifying the security information held by the second holding means to the second control unit, and the first holding means holds the security information notified by the notifying means.

8. The image processing apparatus according to claim 7, wherein the notifying means notifies the security information held by the second holding means to the second control unit, in a case where a condition for the image processing apparatus to transition from the first power mode to the second power mode is satisfied.

9. The image processing apparatus according to claim 6, wherein in a case where it is determined by the determination means not to transition the image processing apparatus from the second power mode to the first power mode, the processing means determines whether to respond to the received packet or discard the received packet based on the received packet.

10. The image processing apparatus according to claim 6, wherein the processing means deletes the security information stored by the storage means in response to completion of processing on the received packet.

11. The image processing apparatus according to claim 6, wherein in the case where it is determined by the determination means to transition the image processing apparatus from the second power mode to the first power mode, the processing means further transfers the received packet to the first control unit.

12. The image processing apparatus according to claim 6, wherein the security communication is IPSec communication.

13. A control method for an image processing apparatus capable of operating in any of a first power mode in which power is supplied to both a first control unit and a second control unit, and a second power mode in which power is supplied to the second control unit and is not supplied to the first control unit, the method comprising, with the second control unit:

receiving a packet transmitted from an external apparatus;

copying and storing the received packet;

analyzing a header of the received packet, and delete the analyzed header;

in a case where the image processing apparatus is in the second power mode, determining whether to transition the image processing apparatus from the second power mode to the first power mode based on a result of the analysis; and in a case where it is determined to transition the image processing apparatus from the second power mode to the first power mode, transitioning the image processing apparatus from the second power mode to the first power mode, and transferring to the first control unit the received packet that was stored and not transferring to the first control unit the received packet from which the header was deleted.

14. A non-transitory computer-readable storage medium storing a computer program for causing a computer to execute the steps of the control method for an image processing apparatus according to claim 13.

15. A control method for an image processing apparatus capable of operating in any of a first power mode in which power is supplied to both a first control unit and a second control unit, and a second power mode in which power is supplied to the second control unit and is not supplied to the first control unit, and capable of executing security communication with an external apparatus, the method comprising, with the second control unit:

holding security information relating to the security communication;

receiving a packet transmitted from the external apparatus;

storing the held security information, in a case where a packet transmitted from the external apparatus is received;

updating the held security information, after the security information is stored;

in a case where the image processing apparatus is in the second power mode, determining whether to transition the image processing apparatus from the second power mode to the first power mode based on the received packet; and in a case where it is determined to transition the image processing apparatus from the second power mode to the first power mode, transitioning the image processing apparatus from the second power mode to the first power mode, and transferring to the first control unit the security information that was stored and not transferring to the first control unit the security information that was updated.

16. A non-transitory computer-readable storage medium storing a computer program for causing a computer to execute the steps of the control method for an image processing apparatus according to claim 15.

* * * * *